United States Patent [19]

Koch, II

[11] 4,303,417
[45] Dec. 1, 1981

[54] SPRAY BOOTH WITH RECONDITIONING FILTER SYSTEM

[75] Inventor: Robert L. Koch, II, Evansville, Ind.

[73] Assignee: George Koch Sons, Inc., Evansville, Ind.

[21] Appl. No.: 193,744

[22] Filed: Oct. 3, 1980

[51] Int. Cl.$^3$ .............................................. B01D 46/04
[52] U.S. Cl. ........................................ 55/96; 55/302;
98/115 SB; 118/326; 118/DIG. 7
[58] Field of Search ........................... 55/96, 302, 320;
98/115 SB; 118/DIG. 7, 326, 634, 312

[56] References Cited

U.S. PATENT DOCUMENTS

| | | | |
|---|---|---|---|
| 3,486,309 | 12/1969 | Wild | 55/302 |
| 3,791,341 | 2/1974 | Diamond | 55/302 |
| 4,007,026 | 2/1977 | Groh | 55/302 |
| 4,223,599 | 9/1980 | Napadow | 118/DIG. 7 |

FOREIGN PATENT DOCUMENTS

| | | | |
|---|---|---|---|
| 649123 | 9/1962 | Canada | 55/302 |
| 2035834 | 6/1980 | United Kingdom | 118/DIG. 7 |

*Primary Examiner*—Bernard Nozick

*Attorney, Agent, or Firm*—Jenkins, Coffey, Hyland, Badger & Conard

[57] ABSTRACT

A spray booth having bottom, top, and back surfaces and a spray gun for depositing spray coating material onto the articles as they are conveyed through the booth. The bottom surface of the spray booth includes a hopper for collecting undeposited coating material and the top surface of the spray booth includes a vent opening. An exhaust fan is coupled to the vent opening for pulling atmosphere from within the spray booth in a first direction through the vent opening. A baffle is positioned between the spray gun and the vent opening for deflecting undeposited coating material and allowing it to fall by gravity into the hopper, and a filter media is positioned between the baffle and vent opening for collecting any remaining undeposited coating material present before being pulled through the vent opening. A clean air plenum is mounted to the spray booth adjacent the vent opening and houses a high-pressure air source and two venturi tubes for periodically directing a pulse of air through the filter in a second direction to dislodge the collected coating material therefrom and allow it to fall by gravity into the hopper.

20 Claims, 1 Drawing Figure

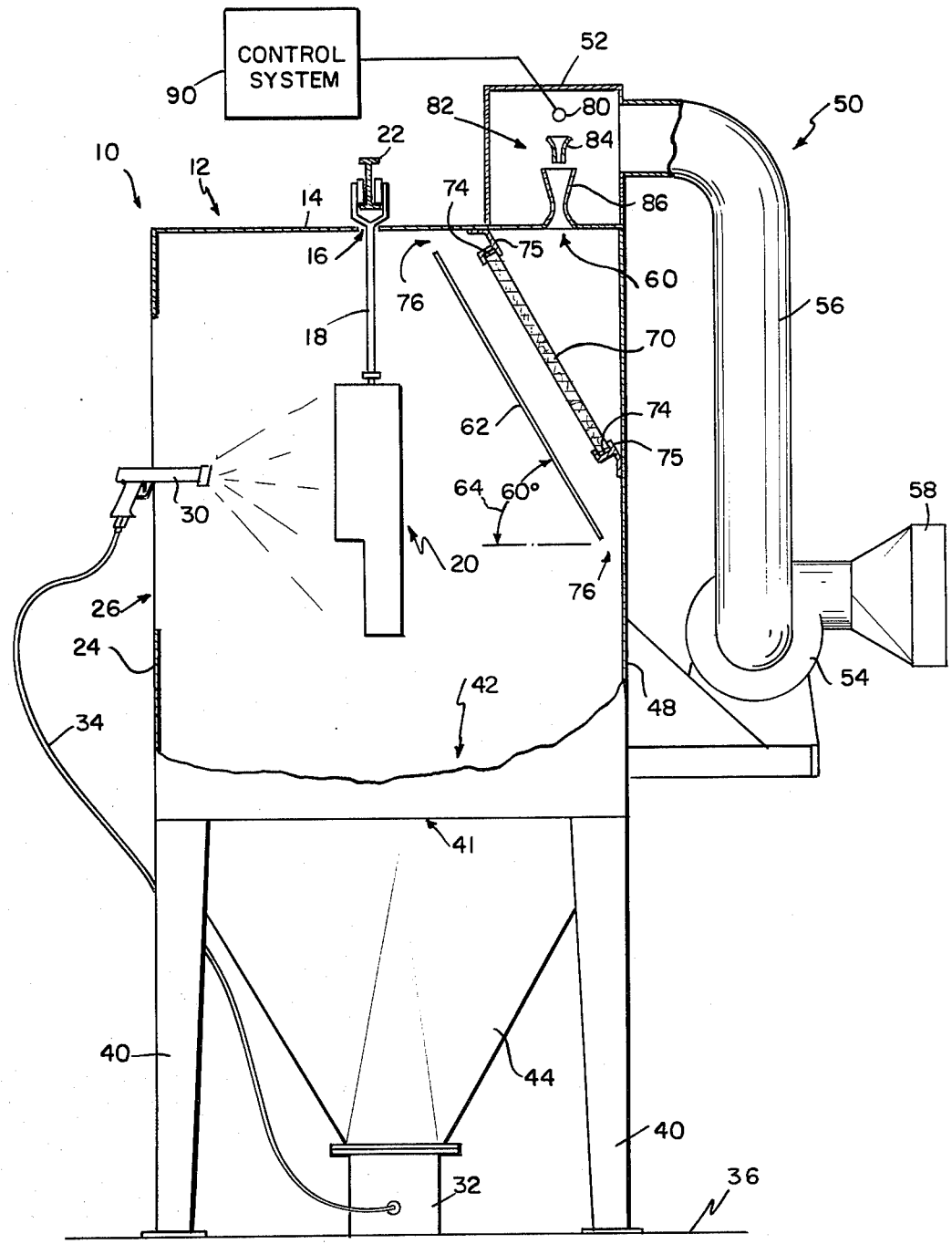

SPRAY BOOTH WITH RECONDITIONING FILTER SYSTEM

The present invention relates to a system for coating articles, and more particularly to a spraying system which includes a reconditioning filter system for venting the spraying system to provide continued and uninterrupted service. The filtering system also provides a method of collecting undeposited coating material.

Various spraying systems for applying a coating to articles are well-known in the art. Some of the spraying systems are represented by U.S. Pat. Nos. 2,528,087; 2,694,466; 3,270,711; 3,801,869; 3,814,002; 3,902,455; 3,905,785; and 3,921,576. Most conventional spraying systems include a spray booth, a spray gun, and an exhaust system for maintaining a negative atmospheric pressure within the spray booth. Some of these conventional spraying systems also include a filter media for filtering the atmosphere within the spray booth before it is vented. In most of these systems, when the filter becomes clogged or when there is a change in the color of coating material, the filter must be replaced. Further, cleaning of these conventional spraying systems is difficult because undeposited coating material is many times pulled through the ducts associated with the exhaust system even when a filter media is employed. Therefore, when there is a change in the color of the coating material, the spraying system must be shut down for a period of time to allow these ducts to be cleaned.

The problem of collecting undeposited coating material is recognized in U.S. Pat. No. 3,791,341. Inflatable bags are provided within a housing, and each bag has a fluid venturi opening at the open upper end thereof. Undeposited coating material is collected on the inflatable bags, and means are provided to intermittently puff pressurized air into each bag to inflate it and thereby cause the undeposited coating material that has settled on the bag to fall by gravity into a lower end of the spraying system. These inflatable bags are positioned within the exhaust ducts of the spraying system, and provide means for collecting some of the undeposited coating meaterial in the atmosphere being pulled from within the spraying system by a suitable air circulating means. However, because of the arrangement of these inflatable bags and their position within the ducts of the exhaust system, some undeposited coating material collects on the ducts and it is still necessary to clean the spraying system. Further, it is difficult and time-consuming to replace the filters when they become worn because of the number of filters which must be used and their location.

It is therefore one object of the present invention to provide a spraying system which includes a filtering media positioned within the spray booth so that undeposited coating material is not pulled through any of the exhaust ducts leaving the spray booth. Accordingly, no cleaning of the exhaust ducts of the spraying system is required for a color change in the coating material.

It is a further object of the present invention to provide a spraying system wherein undeposited coating material is first deflected and allowed to fall by gravity to the bottom of the spray booth for collection, and any remaining undeposited coating material is collected by the filtering media. The undeposited coating material collected by the filtering media is dislodged from the filtering media by periodic bursts of pressurized air and allowed to fall by gravity to the bottom of the spray booth for collection.

It is yet another object of the present invention to provide a spraying system as described above wherein the filtering media is automatically reconditioned for continued and uninterrupted service. The periodic pulses of compressed air serve to self-clean the filtering media so that less frequent changes of the filtering media are needed.

In a spraying system for applying a coating to articles of the type which includes a spray booth having top and back surfaces, a spray gun, a vent opening, a filter positioned between the spray gun and the vent opening, and an exhaust fan to pull atmosphere from within the spray booth through the filter in a first direction to maintain a negative atmospheric pressure within the spray booth, the improvement of the present invention includes means for automatically reconditioning the filter for continued and substantially uninterrupted service, wherein the reconditioning means includes a pulse air means positioned between the fan and the filter for periodically directing a pulse of air through the filter in a second direction to dislodge undeposited coating material collected by the filter.

According to the present invention, a spraying system for applying a coating to articles includes a spray booth having bottom, top, and back surfaces; a spray gun for depositing coating material onto the articles; the bottom surface of the spray booth including a hopper for collecting undeposited coating material; the top surface of the spraying booth including a vent opening; an exaust fan coupled to the vent opening for pulling atmosphere from within the spray booth in a first direction through the vent opening to maintain a negative pressure within the spray booth; a baffle positioned between the spray gun and the vent opening for deflecting undeposited coating material into the hopper; a filter positioned between the baffle and the vent opening for collecting any remaining undeposited coating material present in the atmosphere being pulled from within the spray booth; and means positioned between the filter and the fan for self-cleaning the filter; the filter self-cleaning means including a high-pressure air source, at least one venturi tube coupled to the vent opening adjacent the air source for directing air through the filter in a second direction to dislodge the collected coating material therefrom and allow it to fall by gravity into the hopper, and control means for periodically releasing pulses of compressed air which pass through the venturi tube in the second direction.

According to the present invention, a method of maintaining a negative atmospheric pressure and collecting undeposited coating material in a spraying system of the type including a spray booth and a spray gun for depositing coating material to articles for continued and substantially uninterrupted service includes the steps of pulling the atmosphere from within the spray booth in a first direction past a baffle, through a filter media, and through a vent opening to maintain the negative pressure in the spray booth, and collecting undeposited coating material in the atmosphere by deflecting undeposited coating material off of the baffle into a collection hopper prior to passage of the atmosphere through the vent opening, accumulating substantially all remaining undeposited coating material in the filter media prior to passage of the atmosphere through the vent opening, and periodically directing a pulse of air through the filter media in a second direction to dislodge the accumulated coating material in the filter media and allow it to fall into the collection hopper.

Various other features and advantages of the present invention will become apparent in view of the following detailed description of one embodiment thereof, which description should be considered in conjunction with the accompanying drawing. The drawing is an end view, partly broken away and cross-sectioned, of a powder spray booth which includes the reconditioning exhaust filter system of the present invention.

In the FIGURE, there is shown a spray system 10 for applying a coating to articles incorporating the present invention. The system 10 includes a spray booth or enclosure 12 for enclosing the spraying operations of the system 10. The spray booth 12 has a top surface 14 which includes a slot 16 extending lengthwise of the booth 12, providing a channel for receiving a plurality of hangers 18 carrying a plurality of articles 20 to be coated. The articles 20 are carried through the spray booth 12, for example, by an overhead conveyor 22.

The front surface 24 of the spray booth 12 includes an opening 26 for a spray gun 30 to deposit coating material on the articles 20 as they are carried through the spray booth 12. The spray gun 30 may be any conventional spray gun for applying a powder-coating material to the articles 20. Coating material is delivered to the spray gun 30 from a source of coating material 32 which typically includes a coating material container and a pump (not shown). The source of coating material 32 is connected to the spray gun 30 through an elongated flexible hose 34.

According to the present invention, the spray booth 12 is elevated above the floor or ground surface 36 by a plurality of legs 40. The bottom surface 41 of the spray booth 12 includes an opening 42 which is connected to a funnel-shaped collection hopper 44. In turn, the source of coating material 32 is located beneath the spray booth 12 and connected to the hopper 44 so that coating material which does not adhere to the articles 20 and which falls to the bottom 41 of the spray booth 12 is funnelled by the collection hopper 44 back into the source of coating material 32.

Mounted to the top and back surfaces 14, 48 of the spray booth 12 is an exhaust system 50 for pulling atmosphere from within the spray booth 12 to the exterior thereof to maintain a negative pressure within the spray booth 12 and to prevent coating material from drifting outside the spray booth 12 through the opening 26. Forming the exhaust system 50 is a plenum 52 mounted to the top surface 14 of the spray booth 12 adjacent a vent opening 60 provided in the top surface 14. A conventional suction fan or blower 54 is mounted to the back surface 48 of the spray booth 12 and is connected to the plenum 52 by a tubular duct member 56. Fan 54 is employed to pull the atmosphere from within the spray booth 12 through the vent opening 60 into the plenum 52 and duct member 56. The atmosphere is finally exhausted through an absolute or final filtering media 58 before being released into the environment surrounding the booth 12 to reduce the contaminants contained within the atmosphere pulled from the spray booth 12. As shown in the Figure, this final or absolute filter 58 is positioned after the fan 54 in the exhaust system so that the atmosphere has already been pulled through the ductwork of the system 50 before passing therethrough.

One of the problems associated with conventional spraying systems is that when the atmosphere is pulled from within the spray booth, undeposited coating material present in the atmosphere is also pulled through the vent opening into the duct network connecting the fan to the vent opening. Accordingly, this undeposited coating material is deposited on the interior of the ductwork and it is therefore necessary to periodically clean the ductwork of the exhaust system of the spraying system. Further, the cleaning of the ductwork may be more frequently necessitated due to color changes in the coating material. Various efforts have been made to eliminate or at least substantially reduce the quantity of undeposited coating material which is pulled through the exhaust system of the spraying system. One such solution has been to include a filter in the ductwork of the exhaust system to collect undeposited coating material present in the atmosphere being pulled from within the spray booth. However, in many applications, this solution has been found unacceptable, since the filter must also be frequently changed when it either becomes clogged with undeposited coating material or when there is a change in the color of the coating material being used. Further, it has sometimes been found that in attempting to collect undeposited coating material the flow rate through the filter is not sufficient to allow a fan of standard size to pull the atmosphere from the spray booth at a rate sufficient enough to maintain a negative pressure within the spray booth. In addition, there is no way to reclaim the undeposited coating material collected within the filter so that it can be reused.

According to the present invention, a unique filtering arrangement collects undeposited coating material, provides a sufficient flow rate to maintain a negative atmospheric pressure within the spray booth 12, and is automatically and periodically self-cleaned and reconditioned for continued and uninterrupted service of the spraying system 10. In the process of reconditioning of the filter media, undeposited coating material collected in the filter media is dislodged and collected for reuse in the spraying system 10.

Positioned between the spray gun 30 and the vent opening 60 formed in the top surface 14 of the spray booth 12 is a removable baffle 62. The baffle 62 is positioned in angular relationship to the vent opening 60 at an illustrative angle 64 relative to the bottom surface 41 of the spray booth 12 of generally 60°. This angle 64 is not deemed to be critical. Undeposited coating material present in the atmosphere within the spray booth 12 which is being pulled through the vent opening 60 is initially deflected by the baffle 62 and allowed to fall by gravity to the bottom surface 41 of the spray booth 12 where it falls into the collection hopper 44 and eventually into the source of coating material 32.

Positioned in spaced parallel relationship to the baffle 62, between the baffle 62 and the vent opening 60, are one or more rectangular flat filter panels 70. The angle of the filter panel 70 relative to the vent opening 60 and the bottom surface 41 of the spray booth 12 is generally the same as the angle 64 of the baffle 62. The filter panel 70 is removably mounted to the top surface 14 and back surface 48 of the spray booth 12 by mounting straps 74. A foam-rubber seal 75 is provided between the filter panels 70 and the surfaces 14, 48 of the spray booth 12 so that substantially all atmosphere within the spray booth 12 which is pulled through the ductwork of the exhaust system 50 passes through the filter panel 70 before reaching the ductwork. It should be noted that upper and lower spaces 76 are provided between the top and back surfaces 14, 48 of the spray booth 12 and the baffle 62 to allow the atmosphere within the spray booth 12 and substantially all remaining undeposited coating material in the atmosphere which has not previously been deflected by the baffle 62 to be pulled around the baffle 62.

The filter panels 70 may be pulse-clean filter panels manufactured by American Air Filter, Louisville, Ky. Each illustrative filter panel is two feet wide and four feet long, and has the capability of filtering 1,000 cubic feet per minute of atmosphere. These panels 70 are constucted to permit air flow through the filter media with a minimum amount of resistance. Preferably, two of these filter panels 70 are mounted within the spray booth 12 in the manner previously described so that a total of 2,000 cubic feet per minute of atmosphere can be filtered. Although the pulse-clean filters manufactured by American Air Filter may be utilized, other rectangular filter panels having similar characteristics as those manufactured by American Air Filter may also be used.

Included within the plenum 52 and positioned between the vent opening 60 and the fan 54 is a compressed air supply source 80 having controllable valves (not shown) which may be opened and closed to provide a pulse of air in the direction of the vent opening 60. Interposed between the source of compressed air 80 and the vent opening 60 is a venturi tube arrangement 82 for each filter panel 70 which includes a primary venturi tube 84 located in proximity to the compressed air source 80 and a secondary venturi tube 86 connected to the top surface 14 of the spray booth 12 adjacent the vent opening 60 in series with the first venturi tube 84. The valves associated with the source of compressed air 80 are electrically connected to a control system 90 which may include, for example, a timer for periodically and automatically opening and closing the valves to release a short pulse of air which passes through the venturi system 82 and which is directed toward the filter panel 70 through the vent opening 60 to dislodge any collected undeposited coating material. The dislodged coating material is then allowed to fall by gravity to the bottom of the spray booth 12 and through the collection hopper 44 into the source of coating material 32. In one embodiment, the air pulse is approximately twenty-five to fifty milliseconds in duration and is supplied approximately once every minute. By periodically self-cleaning the filter panels 70, a flow rate is maintained which is always sufficient enough to maintain a negative atmospheric pressure in the spray booth 12. Understandably, the length of duration of the air pulse and the time period between successive air pulses will depend upon the number of spray guns 30 being used in the spraying system 10 and the amount of coating material being collected in the filter panels 70.

The operation of a spraying system 10 including the present invention can briefly be described by referring to the drawing. As coating material is applied to the articles 20 by the spray gun 30, some of the coating material does not get deposited onto the article 20 and falls by gravity through the collection hopper 44 back into the source of coating material 32. Additional undeposited coating material remains in the atmosphere within the spray booth 12 and is drawn in a normal flow direction toward the vent opening 60 by the suction fan 54 to prevent it from drifting outside the spray booth 12 through the opening 26. As the undeposited coating material in the atmosphere is drawn toward the vent opening 60, a substantial portion of the coating material strikes the baffle 62 and is deflected into the collection hopper 44 and allowed to fall into the hopper 44 and eventually into the source of coating material 32. Any remaining undeposited coating material in the atmosphere is collected in the filter panels 70 before the atmosphere passes through the vent opening 60 so that the atmosphere passing through the venturi system 82 and the duct network associated with the exhaust system 50 is substantially free of coating material. This venting and collecting feature reduces the frequency of cleaning of the duct network associated with the exhaust system 50.

Periodically, the control system 90 activates the compressed air source 80 to release a pulse of compressed air through the venturi system 82 in a direction opposed to the normal air flow through the filter panels 70. The venturi arrangement 82 is used to entrain sufficient air to properly pulse-clean the filter panels 70. The primary venturi tube 84 is seeded first by the pulse of compressed air, and it entrains air from the plenum 52 and duct member 56 to seed the secondary venturi tube 86. The secondary venturi tube 86 entrains additional air from the plenum 52 and duct member 56 so that a quantity of approximately three cubic feet of air is directed toward the filter panels 70 to dislodge any collected coating material therefrom. By dislodging the collected coating material from the filter panels 70, the panels are automatically reconditioned and cleaned for continued and uninterrupted service of the spraying system 10 and a sufficient flow rate is maintained through the filter panels 70 to maintain the negative pressure within the spray booth 12. The dislodged undeposited coating material is allowed to fall by gravity to the bottom 41 of the spray booth 12 and is collected by hopper 44 and, in turn, the source of coating material 32.

From the above description, it can be appreciated that the present invention provides an improved method of maintaining a negative atmospheric pressure in a spray booth 12 and of collecting undeposited coating material present in the atmosphere before it passes through the vent opening 60 of the booth 12 within a spraying system 10, while at the same time substantially reducing the need for cleaning the spraying system 10 by automatically reconditioning the filter panels 70.

What is claimed is:

1. A spraying system for applying a coating to articles including a spray booth having top and back surfaces, a spray gun, a vent opening provided in one of the surfaces of the booth, a flat filter panel positioned in the booth between the spray gun and the vent opening, sealing means provided between the filter panel and the surfaces of the booth, an exhaust fan coupled to the vent opening for pulling atmosphere from within the spray booth through the flat filter panel in a first direction at a sufficient rate to maintain a negative atmospheric pressure within the spray booth, and means for automatically reconditioning the filter panel for continued and substantially uninterrupted service, wherein the reconditioning means includes pulse-air means and at least two venturi tubes coupled in series between the pulse-air means and the filter panel for periodically directing a wave of air through the filter panel in a second direction to dislodge undeposited coating material collected by the filter panel.

2. The apparatus as recited in claim 1 wherein the pulse-air means and venturi tubes are housed within a clean air plenum adjacent the vent opening.

3. The apparatus as recited in claim 2 wherein the pulse-air means includes means for controlling the periodic release of sharp bursts of compressed air.

4. The apparatus as recited in claim 1, further comprising a baffle positioned between the spray gun and the vent opening for deflecting undeposited coating material in the atmosphere to a bottom surface of the booth for collection.

5. The apparatus as recited in claim 4 wherein the baffle is positioned in spaced parallel relationship to the filter panel.

6. The apparatus as recited in claim 5 wherein the baffle and filter panel are positioned in the booth in angular relationship to the vent opening.

7. The apparatus as recited in claim 6 wherein the filter panel has a filtering rate of at least 1,000 cubic feet of air per minute.

8. A spraying system for applying a coating to articles, comprising a spray booth having bottom, top, and back surfaces, a spray gun for depositing coating material onto the articles, at least one of the top and back surfaces of the spray booth including a vent opening, an exhaust fan coupled to the vent opening for pulling atmosphere from within the spray booth in a first direction through the vent opening to maintain a negative atmospheric pressure within the spray booth, a baffle positioned between the spray gun and the vent opening for deflecting undeposited coating material in the atmosphere to the bottom surface for collection, a filter positioned between the baffle and the vent opening for collecting any remaining undeposited coating material present in the atmosphere being pulled from within the spray booth, and means positioned between the filter and the fan for self-cleaning the filter, the filter self-cleaning means including a high-pressure air source, at least one venturi tube coupled to the vent opening adjacent the air source for directing air through the filter in a second direction to dislodge the collected coating material therefrom and allow it to fall by gravity to the bottom surface, and control means for periodically releasing pulses of compressed air which pass through the venturi tube in the second direction to self-clean the filter.

9. The spraying system as recited in claim 8 further comprising means for removably mounting the filter in sealing relationship to the top and back surfaces of the spray booth and in angular relationship to the vent opening.

10. The spraying system as recited in claim 9 wherein the baffle is positioned in spaced parallel relationship to the filter.

11. The spraying system as recited in claim 10, further comprising a clean air plenum mounted to the spray booth adjacent the vent opening, means connecting the plenum to the exhaust fan, and first and second venturi tubes positioned in series with each other and in series with the high-pressure air source, the venturi tubes and air source being housed within the plenum.

12. A spraying system for applying a coating to articles, comprising a spray booth having bottom, top, and back surfaces, a spray gun for depositing coating material onto the articles, the bottom surface of the spray booth including a hopper for collecting undeposited coating material, at least one of the other surfaces of the spray booth including a vent opening, an exhaust fan coupled to the vent opening for pulling atmosphere from within the spray booth in a first direction through the vent opening to maintain a negative atmospheric pressure within the spray booth, a baffle positioned between the spray gun and the vent opening for deflecting undeposited coating material in the atmosphere into the hopper, a filter positioned between the baffle and the vent opening for collecting any remaining undeposited coating material present in the atmosphere being pulled from within the spray booth, and means positioned between the filter and the fan for self-cleaning the filter, the filter self-cleaning means including a high-pressure air source, at least one venturi tube coupled to the vent opening adjacent the air source for directing air through the filter in a second direction to dislodge the collected coating material therefrom and allow it to fall by gravity into the hopper, and control means for periodically releasing pulses of compressed air which pass through the venturi tube in the second direction to self-clean the filter.

13. The spraying system as recited in claim 12, further comprising means for connecting the spray gun to the hopper for reuse of collected undeposited coating material.

14. The spraying system as recited in claim 12, further comprising means for removably mounting the filter in sealing relationship to the top and back surfaces of the spray booth and in angular relationship to the vent opening.

15. The spraying system as recited in claim 14 wherein the baffle is positioned in spaced parallel relationship to the filter.

16. The spraying system as recited in claim 15 wherein the angle between the filter and the bottom surface of the spray booth is generally 60°.

17. The spraying system as recited in claim 15, further comprising a clean air plenum mounted to the spray booth adjacent the vent opening, means connecting the plenum to the exhaust fan, and first and second venturi tubes positioned in series with each other and in series with the high-pressure air source, the venturi tubes and air source being housed within the plenum.

18. The spraying system as recited in claim 17 wherein the filter is a generally rectangular panel and has the capability of filtering at least 1,000 cubic feet of air per minute.

19. A method of maintaining a negative atmospheric pressure and collecting undeposited coating material in a spraying system of the type including a spray booth and a spray gun for depositing coating material to articles, comprising the steps of pulling the atmosphere from within the spray booth through a vent opening in a first direction to maintain a negative pressure within the spray booth, and collecting undeposited coating material in the atmosphere by deflecting undeposited coating material off a baffle positioned between the spray gun and the vent opening and allowing it to fall by gravity into a collection hopper, accumulating substantially all remaining undeposited coating material in a filter media positioned between the baffle and the vent opening, and periodically directing a pulse of air through the filter media in a second direction from a source of compressed air positioned between the filter media and the fan to dislodge the accumulated coating material in the filter media and allow it to fall by gravity into the collection hopper.

20. The method of claim 18 wherein the atmosphere is pulled through the filter media at a rate of at least 1,000 cubic feet per minute and the flow rate is maintained by periodically dislodging the accumulated coating material from the filter media to continuously maintain the negative pressure within the spray booth.

* * * * *

UNITED STATES PATENT AND TRADEMARK OFFICE
CERTIFICATE OF CORRECTION

PATENT NO. : 4,303,417
DATED : December 1, 1981
INVENTOR(S) : Robert L. Koch, II It is certified that error appears in the above-identified patent and that said Letters Patent are hereby corrected as shown below:

Column 1, line 44, "material" is misspelled.

Column 5, line 12, "constructed" is misspelled.

Column 8, line 62 (Claim 20, line 1), "18" should be -- 19 --.

Signed and Sealed this

Thirteenth Day of April 1982

[SEAL]

Attest:

GERALD J. MOSSINGHOFF

Attesting Officer

Commissioner of Patents and Trademarks